United States Patent
Chang et al.

(10) Patent No.: US 7,254,462 B2
(45) Date of Patent: Aug. 7, 2007

(54) METHOD AND SYSTEM FOR MEASURING A FIGURE OF A WORKPIECE

(75) Inventors: Chih-Kuang Chang, Tu-Cheng (TW); Li Jiang, Shenzhen (CN); Hua-Wei Yang, Shenzhen (CN); Xiao-Chao Sun, Shenzhen (CN)

(73) Assignees: Hong Fu Jin Precision Industry (ShenZhen) Co., Ltd., Shenzhen, Guangdong (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/292,660

(22) Filed: Dec. 2, 2005

(65) Prior Publication Data

US 2006/0122727 A1 Jun. 8, 2006

(30) Foreign Application Priority Data

Dec. 3, 2004 (TW) .............................. 93137366 A

(51) Int. Cl.
*G06F 19/00* (2006.01)

(52) U.S. Cl. ........................... 700/192; 700/98; 33/551
(58) Field of Classification Search ........ 700/184–186, 700/192–195, 98, 31, 108, 78, 159, 168, 700/224–227; 33/551, 559, 503, 504, 702; 702/155, 84, 81, 32
See application file for complete search history.

(56) References Cited

U.S. PATENT DOCUMENTS

| 6,738,727 | B2 | 5/2004 | Chang | |
|---|---|---|---|---|
| 2002/0133268 | A1* | 9/2002 | Kato et al. | 700/193 |
| 2004/0109205 | A1* | 6/2004 | Asano et al. | 358/448 |
| 2005/0071121 | A1* | 3/2005 | Kappel | 702/155 |

* cited by examiner

*Primary Examiner*—Kidest Bahta
(74) *Attorney, Agent, or Firm*—Wei Te Chung

(57) ABSTRACT

A system for measuring a figure of a workpiece includes an application server (2). The application server includes a hardware detecting module (200) for detecting hardware after system activation and for determining whether any error occurs in the hardware. An error prompting module (200) is provided for generating a dialog box to prompt a user to maintain the system. A measuring module (202) is provided for measuring the figure of the workpiece, and for comparing measuring results. A measuring result output module (203) is provided for outputting measuring results in text form. A related method is also provided.

11 Claims, 3 Drawing Sheets

METHOD AND SYSTEM FOR MEASURING A FIGURE OF A WORKPIECE

BACKGROUND OF THE INVENTION

1. Field of the Invention

The present invention relates to measuring a figure of a workpiece, and more particularly to a system and method for measuring a figure of a workpiece via Computerized Numerical Control (CNC) three-dimension coordinate measurement.

2. General Background

Product quality has long been one of the most important factors in maintaining a typical manufacturing enterprise's competitiveness. How to improve the quality of products is an important ongoing pursuit of such enterprise. It is essential to verify the correctness and accuracy of samples before batch production. Traditionally, the verification process for determining whether the coordinates of measuring points on a workpiece are equal to theoretical values is achieved by manual work. This can slow down efficiency, increase errors, and seriously affect the accuracy and consistency of the verification performed.

In recent years, with the performance of computer hardware and software continually improving and with the prices of such equipment becoming more competitive, computers have played a major role in the process of verification. Computer equipment can greatly improve the efficiency and accuracy of verification. A present method for measuring a figure of a center of molding and grinding includes the steps of: obtaining a figure of a workpiece; searching coordinates of the workpiece edge; setting a corresponding function as coordinates of the workpiece; calculating arcs via curve approaching principles and regression calculation; calculating the coordinates of intersections between lines or between lines and arcs; determining whether an outline of the whole workpiece is finished via the above measuring process; if such outline of the whole workpiece is not finished, repeating the above measuring process until the outline of the whole workpiece is finished; calculating the trim size; comparing the trim size with the workpiece size and calculating the difference; and if the trim size is less than the workpiece size, reporting the difference. intersections between lines or between lines and arcs; determining whether outline of the whole workpiece is finished via above measuring process; if such outline of the whole workpiece is not finished, repeating the above measuring process until finishing the outline of the whole workpiece; calculating the trim size; comparing the trim size with workpiece size and calculating the difference; if the trim size less than workpiece size, reporting the difference.

Even though the method discloses how to measure a figure of a workpiece, a next workpiece must undergo the same measuring process, even if the next workpiece is the same kind of workpiece. This can seriously affect the processing speed and accuracy of measurement. Current technology does not teach how to measure a figure of the same kind of a workpiece automatically, thereby simplifying the measuring process and reducing operation time.

What is needed, therefore, is a system and method which can measure a figure of a workpiece automatically and simply.

SUMMARY

A system for measuring a figure of a workpiece in accordance with a preferred embodiment includes an application server, which includes: a hardware detecting module for detecting hardware after system activation and for determining whether any error occurs; an error prompting module for generating a dialog box to prompt a user to maintain the system; a measuring module for measuring the figure of the workpiece; and a measuring result output module for outputting comparison results in text form. The measuring module includes: a measuring information acquiring sub-module for acquiring information of the workpiece, which includes a serial number of the workpiece; a manual execution sub-module for measuring multiple measuring points on the figure according to measurement demands, and for returning coordinates of the measuring points; a coordinate system maintenance sub-module for constructing a new coordinate system, and for converting coordinates of measuring points into coordinates based on the new constructed coordinate system; a measuring result comparing sub-module for comparing the converted coordinates of the measuring points with theoretical coordinates and determining whether the converted coordinates exceed a tolerance range, and for acquiring the comparison results; and an automatic execution sub-module for saving the whole measuring process and the comparing process as a program which is invoked for measuring other workpieces that have the same serial number, and for comparing measuring results automatically.

A method for measuring a figure of a workpiece in accordance with another preferred embodiment includes the steps of: activating a system for measuring a figure of a workpiece, and determining whether an error occurs in hardware; acquiring information of the workpiece if no error occurs, the information comprising a serial number of the workpiece; determining whether a program corresponding to the workpiece exists according to the serial number of the workpiece; constructing a coordinate system if no program exists; measuring multiple measuring points on the figure and returning coordinates of the measuring points; converting coordinates of the measuring points into coordinates based on the constructed coordinate system, and returning converted coordinates of the measuring points; comparing the converted coordinates with theoretical coordinates; saving the whole measuring process and the comparing process as a program, the program corresponding to the serial number of the workpiece being measured; and outputting the converted coordinates of the measuring points and the comparison results.

In the method for measuring a figure of a workpiece, the step of determining whether an error occurs in hardware can comprise the step of generating a dialog box that comprises error information to prompt a user if such error occurs.

In the method for measuring a figure of a workpiece, the step of determining whether a program corresponding to the workpiece exists can comprises the step of invoking the program to measure the workpiece and compare the measuring result automatically if such program exists.

Other advantages and novel features of the present invention will become more apparent from the following detailed description of preferred embodiments when taken in conjunction with the accompanying drawings, in which:

DETAILED DESCRIPTION OF THE INVENTION

Figure 1:
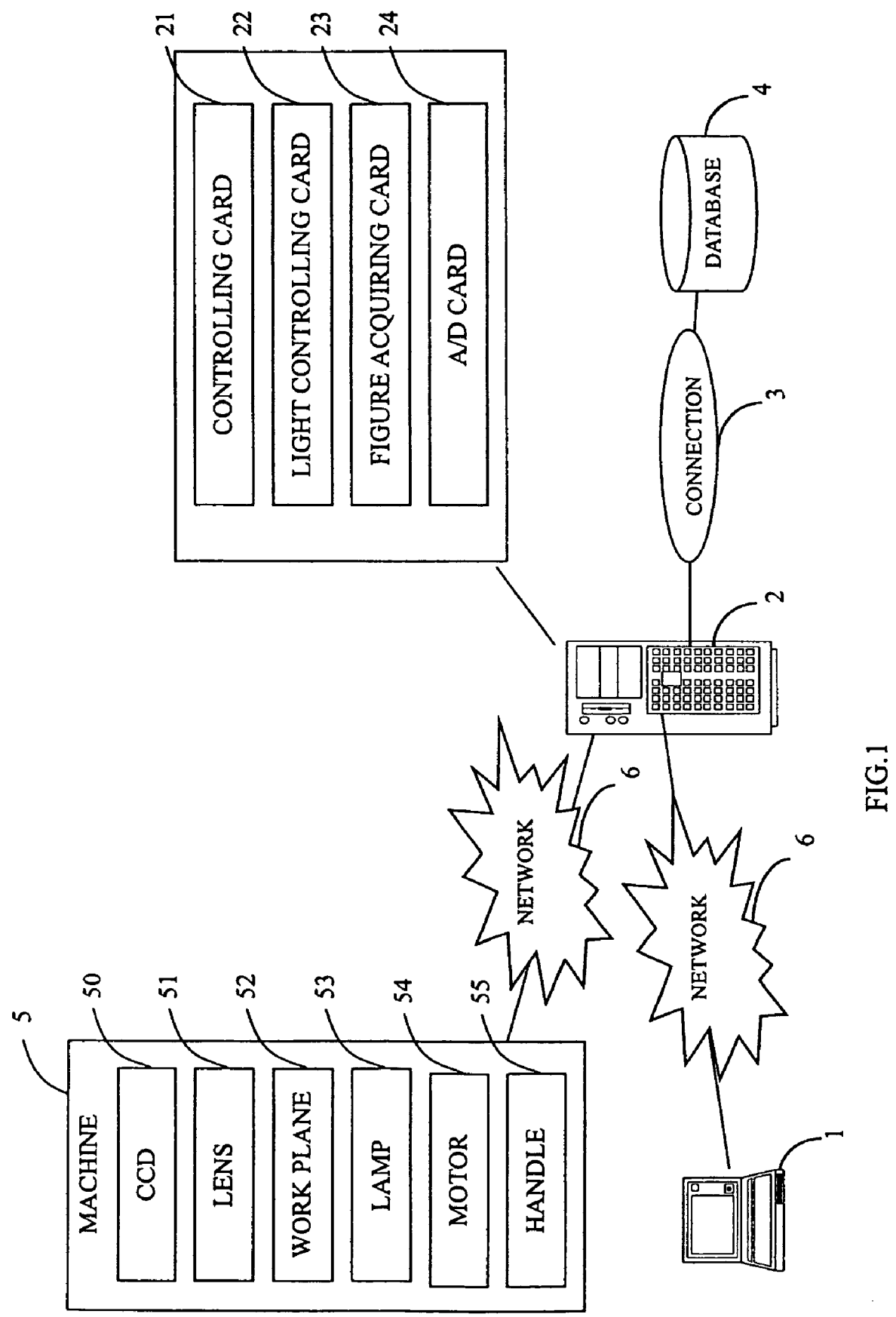
FIG. 1 is a schematic diagram of hardware configuration of a system for measuring a figure of a workpiece in accordance with a preferred embodiment of the present invention.

FIG. 1 is a schematic diagram of hardware configuration of a system for measuring a figure of a workpiece (hereinafter "the system") in accordance with a preferred embodiment of the present invention. The system includes a client computer 1, an application server 2, a database 4, and a machine 5. The client computer 1 provides an operation interface for displaying an operation status of the system dynamically. The client computer 1 may be a desktop computer, a laptop computer, or a notebook PC. The machine 5 includes a CCD (Charge Coupled Device) 50 for converting an optical signal into an electronic signal; a lens 51 for shooting a workpiece being measured (hereinafter "an/the under-measurement workpiece"); a work plane 52 for supporting an under-measurement workpiece; a lamp 53 for providing different kinds of light to help the lens 51 shoot the under-measurement workpiece from different angles, such light including ring light, outline light and coaxial light, etc.; a motor 54 for activating the machine 5; and a handle 55 for controlling motion directions of the lens 51, so that the lens 51 can move to desired X-axis, Y-axis and Z-axis positions.

The application server 2 includes a controlling card 21 for controlling motion of the motor 54, a light controlling card 22 for controlling the lamp 53 of the machine 5, a figure acquiring card 23 for acquiring a figure of the under-measurement workpiece outputted from the CCD 50, and an A/D (analog/digital) card 24 for controlling the handle 55. The application server 2 further includes a plurality of software function modules installed therein for measuring the figure of the under-measurement and workpiece, comparing coordinates of measuring points with theoretical coordinates, and storing the whole measuring process and the comparing process as a program. The program can be invoked to measure other workpieces that have the same serial number or that belong to a same series having the same set of serial numbers. The application server 2 communicates with the client computer 1 and the machine 5 via a network 6. The network 6 may be an intranet, the Internet, or any other suitable type of communications link.

The database 4 is provided for storing all kinds of data produced in the process of measurement, such as a serial number of the workpiece, coordinates of measuring points, theoretical coordinates, a tolerance range, a program and comparison results, etc. The database 4 is connected with the application server 2 via a connection 3. The connection 3 is a database connectivity, such as an ODBC (Open Database Connectivity) or a JDBC (Java Database Connectivity).

Figure 2:
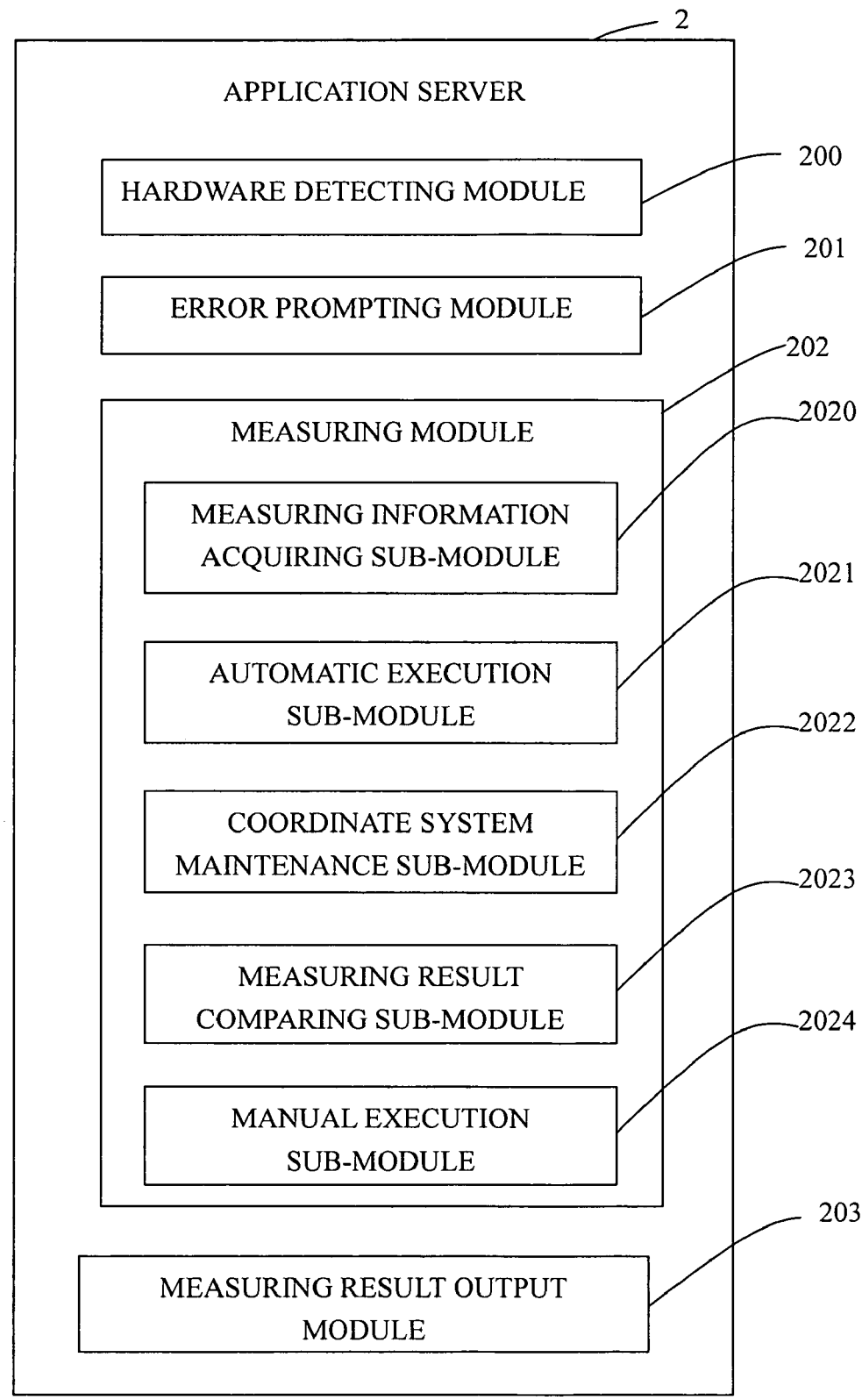
FIG. 2 is a schematic diagram of main software function modules of an application server of FIG. 1.

FIG. 2 is a schematic diagram of main software function modules of the application server 2. The application server 2 includes a hardware detecting module 200, an error prompting module 201, a measuring module 202, and a measuring result output module 203.

The hardware detecting module 200 is used for detecting hardware in the process of system activation and determining whether any error occurs in the hardware. The error prompting module 201 is used for generating a dialog box including error information to prompt a user to maintain the system when the hardware detecting module 200 determines that an error occurred in the hardware.

The measuring module 202 is used for measuring the figure of the under-measurement workpiece, comparing coordinates of measuring points with theoretical coordinates, and storing the whole measuring process and the comparing process as a program. The measuring module 202 includes a measuring information acquiring sub-module 2020, a manual execution sub-module 2024, an automatic execution sub-module 2021, a coordinate system maintenance sub-module 2022, and a measuring result comparing sub-module 2023. The measuring information acquiring sub-module 2020 is used for acquiring information of an under-measurement workpiece. The information includes a serial number of the under-measurement workpiece, etc. Each workpiece corresponds to a serial number stored in the database 4. The manual execution sub-module 2024 is used for measuring a figure of the under-measurement workpiece via measuring multiple measuring points according to measurement demands manually, and for returning coordinates of the measuring points. The objects that constructed the figure are measured by measuring multiple points on the objects, such as lines, planes, circles, holes etc. The coordinate system maintenance sub-module 2022 is used for constructing a new coordinate system according to normal elements, which include datum mark, datum line, datum plane etc. The coordinate system maintenance sub-module 2022 is also used for converting original coordinates of measuring points on the figure into coordinates based on the new constructed coordinate system.

The measuring result comparing sub-module 2023 is used for comparing the converted coordinates of the measuring points with theoretical coordinates and determining whether the converted coordinates exceed a tolerance range, and for acquiring the comparison results. The automatic execution sub-module 2021 is used for saving the whole measuring process and the comparing process as a program, the program corresponding to the serial number of the workpiece measured. The automatic execution sub-module 2021 is also used for invoking the program for measuring the other under-measurement workpieces that have the same serial number and for comparing measuring results automatically. The measuring result output module 203 is used for outputting the converted coordinates of the measuring points and the comparison results in text form for consulting subsequently.

Figure 3:
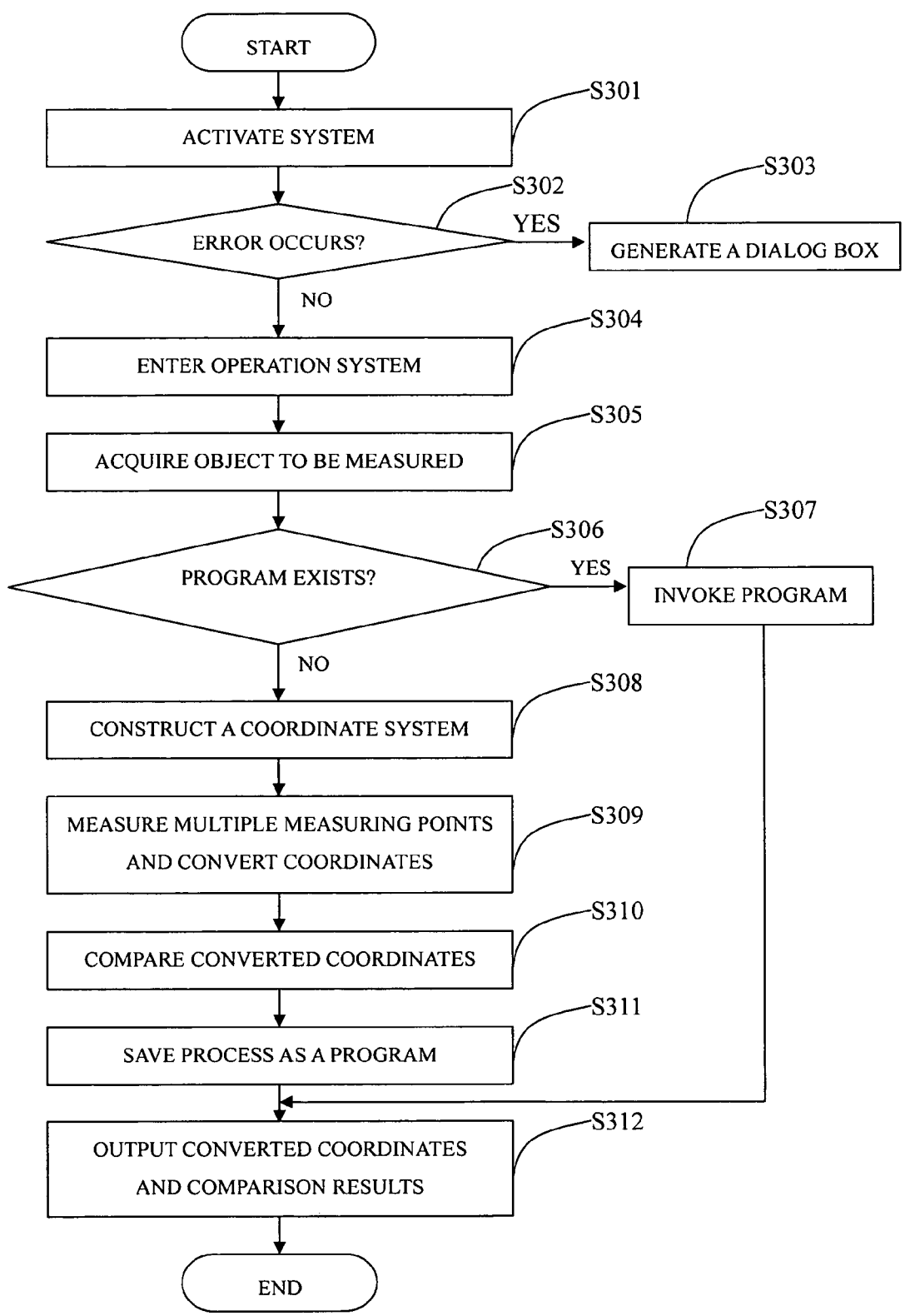
FIG. 3 is a flowchart of a method for measuring a figure of a workpiece in accordance with a preferred embodiment of the present invention.

FIG. 3 is a flowchart of a method for measuring a figure of a workpiece in accordance with a preferred embodiment of the present invention. In step S301, the application server 2 activates the system for measuring a figure of a workpiece. In step S302, the hardware detecting module 200 detects hardware and determines whether any error occurs in the hardware. In step S303, if an error occurs in the hardware, the error prompting module 201 generates a dialog box, which includes error information to prompt a user. Otherwise, if no error occurs in the hardware, in step S304, the system is entered directly. In step S305, the lens 51 shoots an under-measurement workpiece placed on the work plane 52, with the A/D card 24 controlling the motion of the handle 55, and the handle 55 making the lens 51 move near to the under-measurement workpiece. The CCD 50 converts an optical signal of the under-measurement workpiece into an electronic signal, and sends the electronic signal to the application server 2. The figure acquiring card 23 installed in the application server 2 acquires a figure corresponding to the under-measurement workpiece outputted from the CCD 50. The measuring information acquiring sub-module 2020 acquires measurement information of the under-measurement workpiece, which information includes the serial number of the under-measurement workpiece.

In step S306, the automatic execution sub-module 2021 searches the database 4 and determines whether a program according to the serial number of the workpiece exists. In step S307, if such program exists, the automatic execution sub-module 2021 invokes the program to measure the under-measurement workpiece and compare measuring results automatically, and then the procedure goes directly to step S312. Otherwise, if no corresponding program exists in the database 4, in step S308, the coordinate system maintenance sub-module 2022 constructs a coordinate system according to normal elements, which include datum mark, datum line and datum plane, etc. In step S309, the manual execution sub-module 2024 measures multiple measuring points on the figure according to measurement demands and returns coordinates of the measuring points, and the coordinate system maintenance sub-module 2022 converts original coordinates of the measuring points on the figure into coordinates based on the new constructed coordinate system and returns converted coordinates of the measuring points.

In step S310, the measuring result comparing sub-module 2023 compares the converted coordinates with theoretical coordinates stored in the database 4, determines whether the converted coordinates exceed a tolerance range stored in the database 4, and then returns comparison results. In step S311, the automatic execution sub-module 2021 saves the whole measuring process and the comparing process as a program, the program corresponding to the serial number of the workpiece measured. In step S312, the measuring result output sub-module 2023 outputs the converted coordinates of the measuring points and the comparison results in text form.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for measuring a figure of a workpiece, the system comprising an application server, the application server comprising:
   a hardware detecting module for detecting hardware after system activation, and for determining whether any error occurs in the hardware; and
   a measuring module for measuring the figure of the workpiece, the measuring module comprising:
   a measuring information acquiring sub-module for acquiring information of the workpiece, which information includes a serial number of the workpiece;
   a manual execution sub-module for measuring multiple measuring points on the figure according to measurement demands, and for returning coordinates of the measuring points;
   a coordinate system maintenance sub-module for constructing a new coordinate system, and for converting coordinates of the measuring points into coordinates based on the new constructed coordinate system;
   a measuring result comparing sub-module for comparing the coordinates converted of the measuring points with theoretical coordinates and determining whether the converted coordinates exceed a tolerance range, and for acquiring the comparison results; and
   an automatic execution sub-module for saving the measuring process and the comparing process as a program, which is invoked for measuring one or more other workpieces having the same serial number and for comparing measuring results automatically.

2. The system as claimed in claim 1, wherein the application server further comprises:
   a figure acquiring card for acquiring a figure of a workpiece.

3. The system as claimed in claim 1, wherein the application server further comprises:
   an error prompting module for generating a dialog box to prompt a user to maintain the system.

4. The system as claimed in claim 1, wherein the application server further comprises:
   a measuring result output module for outputting converted coordinates of the measuring points and the comparison results in text form.

5. A method for measuring a figure of a workpiece, comprising the steps of:
   activating a system for measuring a figure of a workpiece, and determining whether any error occurs in hardware of the system;
   acquiring information of the workpiece if no error occurs, wherein the information comprising a serial number of the workpiece;
   determining whether a program corresponding to the workpiece exists according to the serial number of the workpiece;
   constructing a new coordinate system according to normal elements if no program exists;
   measuring multiple measuring points on the figure and returning coordinates of the measuring points;
   converting coordinates of the measuring points into coordinates based on the new constructed coordinate system and returning converted coordinates of the measuring points;
   comparing the converted coordinates with theoretical coordinates; and
   saving the whole measuring process and the comparing process as a program, the program corresponding to the serial number of the workpiece measured.

6. The method according to claim 5, further comprising the step of:
   outputting the converted coordinates of the measuring points and the comparison results in text form.

7. The method according to claim 5, wherein the step of determining whether any error occurs in hardware comprises the step of generating a dialog box comprising error information to prompt a user if such error occurs.

8. The method according to claim 5, wherein the step of determining whether a program corresponding to the workpiece exists comprises the step of invoking the program to measure the workpiece and compare the measuring result automatically if such program exists.

9. A method for measuring figures of a series of workpieces, comprising the steps of:
   detecting hardware after system activation, and for determining whether any occurs in the hardware;
   retrieving identifiable infonnation of a workpiece to be measured if no error occurs, said identifiable information related to identifying a series of workpieces which said workpiece belongs to;
   verifying said identifiable information to retrieve an available program for said series of workpieces corresponding to said identifiable information;
   measuring a figure of said workpiece by means of a measuring module if said program is not available;

retrieving measured information of said workpiece;

verifying said measured information as being within a tolerance range;

comparing said measured information with standard data of said series of workpieces in order to output results thereof; and establishing another available program for said series of workpieces by saving said measuring process and said comparing process.

10. The method according to claim 9, wherein said measuring step further comprises the steps of constructing a coordinate system, measuring multiple measuring points on said figure of said workpiece to acquire coordinates of said measuring points, and converting said coordinates of said measuring points into coordinates based on said constructed coordinate system.

11. The method according to claim 9, further comprising the steps of:

invoking said program to measure a figure of said workpiece and compare measured information with standard data of said series of workpieces if said program is available; and outputting comparison results.

* * * * *